US009751632B2

(12) United States Patent
Mochizuki et al.

(10) Patent No.: US 9,751,632 B2

(45) Date of Patent: Sep. 5, 2017

(54) MOVEMENT UNIT

(71) Applicant: THK CO., LTD., Tokyo (JP)

(72) Inventors: Hiroaki Mochizuki, Tokyo (JP); Hiroomi Kuribayashi, Tokyo (JP); Akito Kaneko, Tokyo (JP); Keisuke Hagiwara, Tokyo (JP); Yuji Sudo, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 15/024,598

(22) PCT Filed: Aug. 22, 2014

(86) PCT No.: PCT/JP2014/072027

§ 371 (c)(1),
(2) Date: Mar. 24, 2016

(87) PCT Pub. No.: WO2015/045699

PCT Pub. Date: Apr. 2, 2015

(65) Prior Publication Data

US 2016/0236786 A1 Aug. 18, 2016

(30) Foreign Application Priority Data

Sep. 27, 2013 (JP) ................................. 2013-201035

(51) Int. Cl.

*F16M 13/00* (2006.01)
*B64D 11/06* (2006.01)

(Continued)

(52) U.S. Cl.

CPC ........ *B64D 11/0696* (2013.01); *B60N 2/0812* (2013.01); *B64D 11/064* (2014.12); *F16C 29/004* (2013.01); *F16M 13/027* (2013.01)

(58) Field of Classification Search

CPC .............. B64D 11/0696; B64D 11/064; F16M 13/027; F16C 29/004; B60N 2/7015; B60N 2/0825

(Continued)

(56) References Cited

U.S. PATENT DOCUMENTS 4,936,527 A * 6/1990 Gorges ............... B64D 11/0696 104/165
5,273,367 A * 12/1993 Tanaka .................. F16C 29/002 384/25

(Continued)

FOREIGN PATENT DOCUMENTS

DE 20 2008 005 859 U1 7/2008
JP 54-136451 U 9/1979

(Continued)

OTHER PUBLICATIONS

Internarional Search Report dated Nov. 4, 2014, issued in counterpart International Application No. PCT/JP2014/072027 (2 pages).

(Continued)

*Primary Examiner* — Todd M Epps

(74) *Attorney, Agent, or Firm* — Westerman, Hattori, Daniels & Adrian, LLP

(57) ABSTRACT

Provided is a moving unit capable of easily mounting and dismounting a movable body to and from track rails. The moving unit includes the pair of track rails, which are laid on a fixed portion at an interval therebetween, and respectively have guiding surfaces on surfaces opposed to each other, a plurality of moving blocks, which are accommodated and arranged in an accommodating space sandwiched between the pair of track rails, and are configured to travel on the guiding surfaces of the respective track rails, and the movable body, which is arranged so as to be opposed to the fixed portion across the accommodating space, and is retained by the moving blocks. The movable body includes (Continued)

2A 41 3B 2B 22 3A 3B 22 22 α 3B 25(24) 3A 22 3B 44 42 27 42

22 24 26 34 22 32 2A 34 22 32 33 3A 26 31 23 26 24 a mounting and dismounting mechanism, which is configured to change the interval between the moving block to be assembled to one of the track rails and the moving block to be assembled to another one of the track rails to cancel a contact state between the moving blocks and the respective track rails. The mounting and dismounting mechanism is accommodated together with the moving blocks in the accommodating space.

5 Claims, 16 Drawing Sheets

(51) Int. Cl.
*B60N 2/08* (2006.01)
*F16C 29/00* (2006.01)
*F16M 13/02* (2006.01)

(58) Field of Classification Search
USPC ..... 248/274.1, 424, 429; 384/45; 296/65.13, 296/65.11; 297/344.1
See application file for complete search history.

(56) References Cited

U.S. PATENT DOCUMENTS

2001/0016089 A1* 8/2001 Mochizuki ............... B23Q 1/58 384/45
2005/0247846 A1* 11/2005 Jeong .................. B60N 2/0868 248/429
2010/0080496 A1* 4/2010 Mochizuki ............ F16C 29/005 384/45

FOREIGN PATENT DOCUMENTS

JP 61-45772 U 3/1986
JP 2-96518 U 8/1990
JP 3-260962 A 11/1991
JP 4-75222 U 6/1992
JP 2012-13204 A 1/2012
JP 2012-180863 A 9/2012
WO 2005/031082 A1 4/2005

OTHER PUBLICATIONS

Extended Supplementary European Search Report dated Aug. 22, 2016, issued in counterpart Application No. 14848477.7. (6 pages).

* cited by examiner 101
2B
101
2A
2B
42
1
2A
41
42

MOVEMENT UNIT

TECHNICAL FIELD

The present invention relates to a moving unit configured to freely guide a movable body such as various units and tables along a pair of track rails laid on a fixed portion in parallel to each other.

BACKGROUND ART

Hitherto, the moving unit of this type has been disclosed in WO 2005/031082 A1. This moving unit disclosed in WO 2005/031082 A1 is used for freely moving furniture items, electric appliances, and the like on a wall surface of buildings. This moving unit includes a pair of track rails being laid on the wall surface in parallel to each other and each having rolling surfaces for rolling elements, which are formed along a longitudinal direction of the track rails, a plurality of moving blocks assembled to the track rails through intermediation of a large number of the rolling elements that roll on the rolling surfaces of the track rails, and a movable body fixed to the moving blocks and guided along the track rails on the wall surface. Examples of the movable body may include a base plate for fixing electric appliances such as a television or furniture items, and casings themselves of the electric appliances. This moving unit enables such movable bodies to be freely moved on the wall surface.

Further, the moving unit of this type may be used to, for example, move various devices, interior equipment, and the like in a large space such as passenger cabins in aircrafts, ships, or trains so that those devices and interior equipment are arranged at arbitrary positions in the space. Specifically, in a passenger cabin of an aircraft, service units are provided correspondingly to respective seats. Those service units each contain emergency supplies such as an oxygen mask, and devices such as a seat number indication and a reading light are mounted to the service units. When those service units can be moved along a ceiling surface in the passenger cabin and fixed at arbitrary positions, an array pitch of the seats in the passenger cabin can be changed significantly easily.

CITATION LIST

Patent Literature

[PTL 1] WO 2005/031082 A1

DISCLOSURE OF THE INVENTION

Problems to be Solved by the Invention

On the other hand, for changing the array pitch of the seats in the passenger cabin, the number of seats is sometimes increased or decreased along therewith. When the number of seats is increased, the above-mentioned service units are additionally required to be mounted to the track rails. When the number of seats is decreased, the service units are required to be dismounted from the track rails. Therefore, it is important for the above-mentioned moving unit that the movable body can be easily mounted to and dismounted from the track rails.

In the aircrafts and trains, vibration is generated during travel. Therefore, after the movable body is mounted to the track rails, it is important that the movable body and the track rails are firmly integrated with each other, to thereby prevent the movable body from dropping off unintentionally from the track rails. Further, the movable body mounted to the track rails is required to be reliably fixed at a position intended by an operator after being moved along the track rails.

Further, it is also important that a mounting and dismounting apparatus for the movable body, which satisfies the above-mentioned requirements, has a small size and is hardly visible to passengers who use the passenger cabin.

Means for Solving the Problems

The present invention has been made to solve the problems described above, and provides a moving unit capable of easily mounting and dismounting a movable body to and from track rails and constructing a mechanism for realizing the easy mounting and dismounting in a compact fashion, which is hardly visible from outside.

The moving unit according to one embodiment of the present invention includes a pair of track rails, which are laid on a fixed portion at an interval therebetween, and respectively have guiding surfaces on surfaces opposed to each other, a plurality of moving blocks, which are configured to travel on the guiding surfaces of the respective track rails, and a movable body, which is fixed to the moving blocks, and is configured to be freely movable along the track rails. Further, the movable body includes amounting and dismounting mechanism, which is configured to change an interval between the moving block to be assembled to one of the track rails and the moving block to be assembled to another one of the track rails to cancel a contact state between the moving blocks and the respective track rails. The mounting and dismounting mechanism is accommodated together with the moving blocks between the fixed portion and the movable body.

Effects of the Invention

According to the one embodiment of the present invention, the pair of track rails is laid on the fixed portion so that the guiding surfaces on which the moving blocks travel are opposed to each other. The movable body is fixed to the plurality of moving blocks traveling on the guiding surfaces of these track rails. Specifically, the moving blocks traveling on the respective track rails are arranged between the fixed portion and the movable body, and are held in contact with the guiding surfaces of the track rails through a space therebetween. Therefore, when the interval between the moving block to be assembled to the one track rail and the moving block to be assembled to the another track rail is narrowed by operating the mounting and dismounting mechanism provided to the movable body, the contact state between these moving blocks and the track rails is cancel led to enable the moving blocks to be released from the accommodating space. As a result, the movable body retained by the moving blocks can be dismounted from the track rails. Through a reverse operation, the movable body can be mounted to the track rails.

The mounting and dismounting mechanism is accommodated in the space defined by the fixed portion, the pair of track rails, and the movable body, specifically, in the space corresponding to a height of the track rails. Hence, the moving unit itself can be constructed compactly. In addition, the moving blocks and the mounting and dismounting mechanism are accommodated between the movable body and the fixed portion. Therefore, the presence thereof is hardly visible from outside without impairing, for example, design of a passenger cabin of an aircraft.

MODE FOR CARRYING OUT THE INVENTION

Now, with reference to the accompanying drawings, detailed description is made of the present invention.

Figure 1:
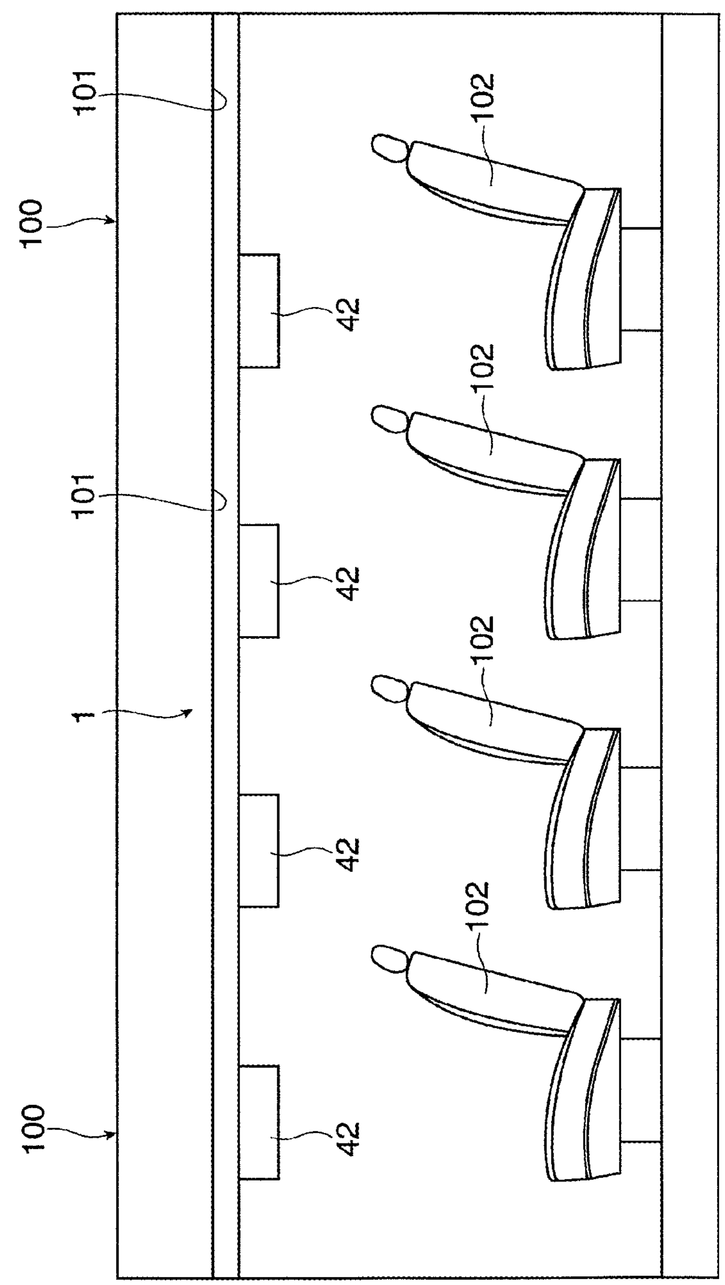
FIG. 1 is a schematic view for illustrating an application example of a moving unit according to the present invention.

FIG. 1 is an illustration of an example of how a moving unit, to which the present invention is applied, is used. For example, in a passenger cabin 100 of an aircraft, service units 42 are arranged on a ceiling panel 101 of the passenger cabin 100 correspondingly to seats 102 for passengers. Those service units 42 each contain emergency supplies such as an oxygen mask, and include various indication devices mounted thereto, such as a seat number indication and a reading light. In general, an array interval of the seats 102 in the passenger cabin 100 of an aircraft is different from airline to airline that operates the aircrafts. Thus, aircraft manufacturers customize the array of the seats 102 in the passenger cabin 100 in accordance with requests from airlines. In view of the circumstances, from a viewpoint of the aircraft manufacturers, when the arrangement of the service units 42 can be freely customized in accordance with the array interval of the seats 102, and when the service units 42 can be freely mounted to and dismounted from the ceiling of the passenger cabin 100 in accordance with an increase or decrease in number of the seats, convenience of assembly of aircrafts can be enhanced. Further, the service units 42 contain the emergency supplies, and hence regular inspection maintenance needs to be performed on the service units 42 themselves. Also from this viewpoint, when the service units 42 can be freely mounted and dismounted, convenience of the airlines that operate aircrafts is enhanced.

The moving unit according to the present invention satisfies such demands. Specifically, the service units 42 are arranged in a freely movable manner on the ceiling panel 101 being a fixed portion, and the service units 42 can be fixed at arbitrary positions on the ceiling panel 101. In addition, the service units 42 can be freely mounted to and dismounted from the ceiling panel 101 being the fixed portion.

Figure 2:
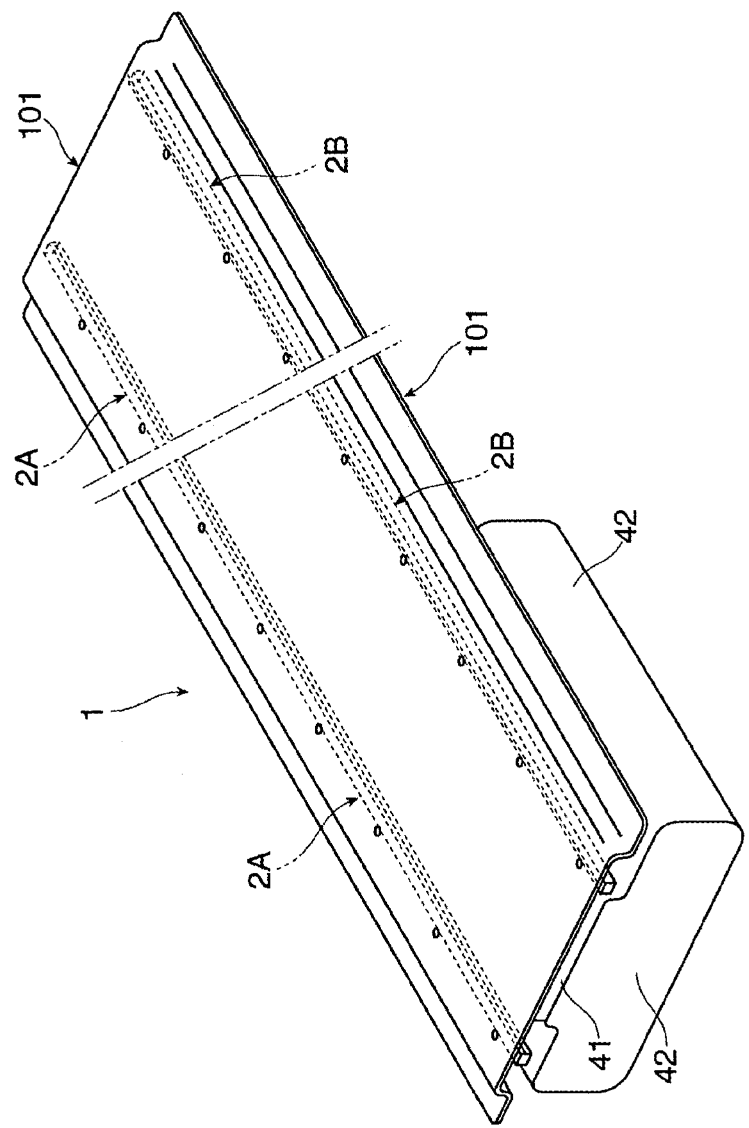
FIG. 2 is a perspective view for illustrating an example of an embodiment of the moving unit to which the present invention is applied.
Figure 3:
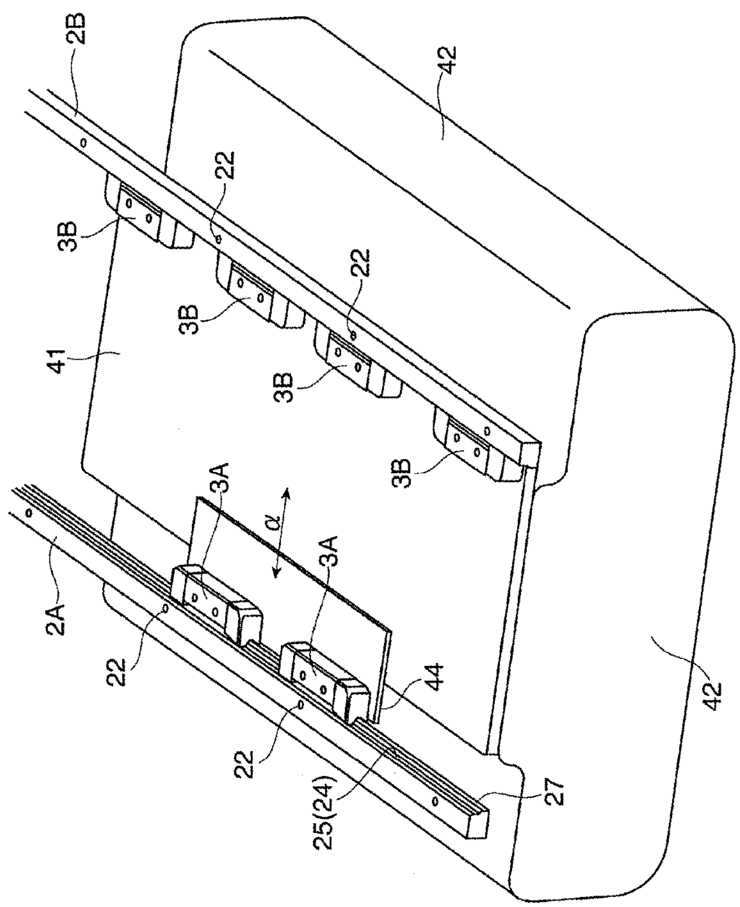
FIG. 3 is an enlarged perspective view for illustrating amain part of the moving unit to which the present invention is applied.

FIG. 2 and FIG. 3 are illustrations of an example of an embodiment of a moving unit 1 to which the present invention is applied. FIG. 2 is a perspective view for illustrating a state in which the moving unit 1 is used so that the service unit 42 is supported by the ceiling panel 101 being the fixed portion. FIG. 3 is a perspective view for illustrating a main part of the moving unit 1 without the ceiling panel 101.

The moving unit 1 includes a first track rail 2A and a second track rail 2B that are laid in parallel to each other on the ceiling panel 101 being the fixed portion in the passenger cabin 100 of the aircraft, moving blocks 3A to be assembled to the first track rail 2A, moving blocks 3B to be assembled to the second track rail 2B, and a movable body 41 to be retained by the moving blocks 3A and 3B. A plurality of the track rails 2A and 2B are arranged in series on the ceiling panel 101, thereby enabling the service units 42 to be guided over a total length of the ceiling panel 101. Further, a plurality of the ceiling panels 101 can also be arranged in series in accordance with a total length of the passenger cabin 100 so that the service units 42 can be guided over the total length of the passenger cabin 100. The track rails 2A and 2B respectively have guiding surfaces 25 that guide the moving blocks 3A and 3B along a longitudinal direction thereof. When the plurality of track rails 2A and 2B are laid in series, the guiding surfaces 25 of the track rails 2A and those of the track rails 2B become linearly continuous to respectively form single guiding surfaces.

In the example illustrated in FIG. 3, the pair of track rails 2A and 2B is arranged so that the guiding surfaces 25 thereof are opposed to each other, and the moving blocks 3A and 3B fixed to the movable body 41 are assembled outward from an inside of the pair of the track rails 2A and 2B. The moving blocks 3A and 3B travel on the guiding surfaces 25 of the track rails 2A and 2B while bearing a load exerted on the movable body 41. The moving blocks 3A and 3B can be freely moved along the longitudinal direction of the track rails 2A and 2B. Then, under a state in which the moving blocks 3A and 3B are assembled to the respective track rails 2A and 2B, the movable body 41 is prevented from dropping off from a position between the pair of track rails 2.

In this way, the movable body 41 fixed to the moving blocks 3A and 3B can be freely moved along the track rails 2A and 2B. In addition, when the service units 42 are fixed to the movable body 41, the service units 42 can be freely moved to arbitrary positions on the long ceiling panel 101. The movable body 41 is formed of a metal material or a resin material.

Among the moving blocks 3A and 3B, the second moving blocks 3B traveling on the second track rail 2B are directly fixed to the movable body 41. However, the first moving blocks 3A traveling on the first track rail 2A are supported on the movable body 41 through intermediation of retaining plates 44 of a mounting and dismounting mechanism. Thus, the first moving blocks 3A can be moved together with the retaining plates 44 along a direction indicated by the arrowed line $\alpha$ illustrated in FIG. 3. Specifically, by operating the mounting and dismounting mechanism, an interval between the first moving blocks 3A and the second moving blocks 3B can be changed to dismount the movable body 41 together with the moving blocks 3A and 3B from the track rails 2A and 2B. In FIG. 3, only the retaining plate 44 that is movable with respect to the movable body 41 is illustrated as the mounting and dismounting mechanism, and details of the mounting and dismounting mechanism are described later.

In FIG. 3, the ceiling panel 101 (fixed portion) on which the track rails 2A and 2B are laid is omitted. In practice, the moving blocks 3A and 3B are accommodated in a space defined by the track rails 2A and 2B, the ceiling panel 101, and the movable body 41. Unless the movable body 41 is dismounted from the track rails 2A and 2B, the presence of the moving blocks 3A and 3B is not visible from outside. Further, the mounting and dismounting mechanism is accommodated together with the moving blocks 3A and 3B in the space sandwiched between the ceiling panel 101 and the movable body 41.

In the example illustrated in FIG. 2 and FIG. 3, the moving blocks 3A and 3B retain the plate-like movable body 41 and the service unit 42 is fixed to this movable body 41. However, as a matter of course, the movable body 41 may be formed integrally with the service unit 42 and the moving blocks 3A and 3B may retain the service unit 42 itself. Further, in the example illustrated in FIG. 2 and FIG. 3, the moving blocks 3 of the present invention are applied to the service unit 42 in the passenger cabin 100 of an aircraft. However, an object to be fixed to the movable body 41 is not limited to the service unit 42. Further, in the following description, the ceiling panel 101 is used as the fixed portion to which the track rails 2A and 2B are laid. However, an object to which the track rails 2A and 2B are laid is not limited thereto, and as a matter of course, the object to which the track rails 2A and 2B are laid may include a wall surface, a floor, or other machinery equipment.

Further, in FIG. 3, the two moving blocks 3A are assembled to the first track rail 2A, whereas the four moving blocks 3B are assembled to the second track rail 2B. However, the number of moving blocks 3A and 3B to be assembled to each of the track rails 2A and 2B can be arbitrarily determined in accordance with, for example, a magnitude of the load exerted on the movable body 41.

Figure 4:
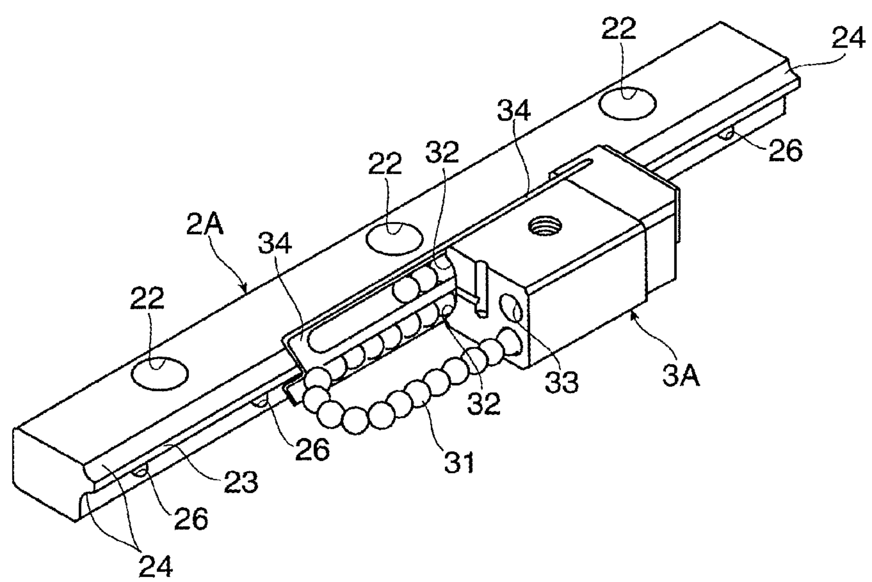
FIG. 4 is a perspective view for illustrating a combination of a moving block and a track rail that can be used in the moving unit of the present invention.

FIG. 4 is a perspective view for illustrating an example of a combination of the track rail 2A (2B) and the moving block 3A (3B). In the example illustrated in FIG. 4, the track rail 2A is formed into a substantially rectangular shape in cross-section perpendicular to the longitudinal direction thereof. Mounting holes 22 for fixing bolts are formed through the track rail 2A at predetermined intervals along the longitudinal direction. Those mounting holes 22 are used when the track rail 2A is laid on the ceiling panel 101 being the fixed portion.

Further, on one side surface of the track rail 2A, a projection portion 23 is formed along the longitudinal direction. On upper and lower sides with respect to this projection portion 23, a pair of rolling surfaces 24 for balls 31 is formed as the guiding surface 25. Those ball rolling surfaces 24 are each inclined at an angle of 45° with respect to a bottom surface of the track rail 2A, and the balls 31 roll on the pair of rolling surfaces 24 while sandwiching the projection portion 23.

Still further, a plurality of fixing holes 26 are formed through the track rail 2A at predetermined intervals in the longitudinal direction. Those fixing holes 26 are positioned between the projection portion 23 and the bottom surface of the track rail 2A, and formed through side surfaces of the track rail 2A. As described later, those fixing holes 26 are used when the moving blocks 3 are fixed at arbitrary positions on the track rail 2A.

Meanwhile, the moving block 3A includes a large number of the balls 31, and those balls 31 roll on the rolling surfaces 24 of the track rail 2A. With this, the moving block 3A can be freely moved along the track rail 2A. In the moving block 3A, load-rolling surfaces 32 are formed in two rows so as to be opposed to the rolling surfaces 24 of the track rail 2A. When the rolling surfaces 24 and the load-rolling surfaces 32 are opposed to each other, load ball paths are formed therebetween, through which the balls 31 roll while bearing a load between the track rail 2A and the moving block 3A.

Further, the moving block 3A has endless circulation paths 33 in two systems for the balls 31 correspondingly to the load-rolling surfaces 32 in two rows. The endless circulation paths 33 couple both ends of the load ball paths, and each have an inner diameter set slightly larger than a diameter of each of the balls 31. Thus, after rolling on the load-rolling surfaces 32, the balls 31 roll on the endless circulation paths 33 under a non-load state, and then are returned onto the load-rolling surfaces 32. In other words, the balls repeatedly roll on the load ball paths through the endless circulation paths 33 so as to enable the moving block 3A to move over the entire region in the longitudinal direction of the track rail 2A. Note that, in FIG. 4, for the sake of better understanding of how the balls 31 circulate in the moving block 3A, half of the moving block 3A is omitted, and the balls 31 illustrated therein are those only in one of the two systems.

Still further, a retaining plate 34 is mounted to the moving block 3A, and the retaining plate 34 is positioned between the moving block 3A and the track rail 2A. The retaining plate 34 has a pair of opening portions formed so as to be opposed to the pair of rolling surfaces 24 formed on the track rail 2A. Spherical surfaces of the balls 31 to roll on the load-rolling surfaces 32 of the moving block 3A are partially exposed from those opening portions, and exposed parts of the spherical surfaces are held in contact with the rolling surfaces 24 of the track rail 2A. A width of each of the opening portions is set smaller than the diameter of each of the balls 31. Even when the moving block 3A is separated from the track rail 2A, the balls 31 do not drop off from the moving block 3A.

The moving block of the present invention is not limited to the moving block illustrated in FIG. 4, specifically, a moving block of such a type that the endless circulation paths for the balls are formed and the balls roll on the rolling surfaces 24 of the track rail 2A. For example, the moving block of the present invention may be a moving block of such a type that the moving block including a low-friction sliding contact member slides on the track rail, or such a type that the moving block including pivotally supported wheels travels on the track rail while rotating the wheels.

Next, a configuration for mounting and dismounting the movable body 41 to and from the track rails 2A and 2B in two rows, specifically, the mounting and dismounting mechanism for the movable body 41 is described.

Figure 5:
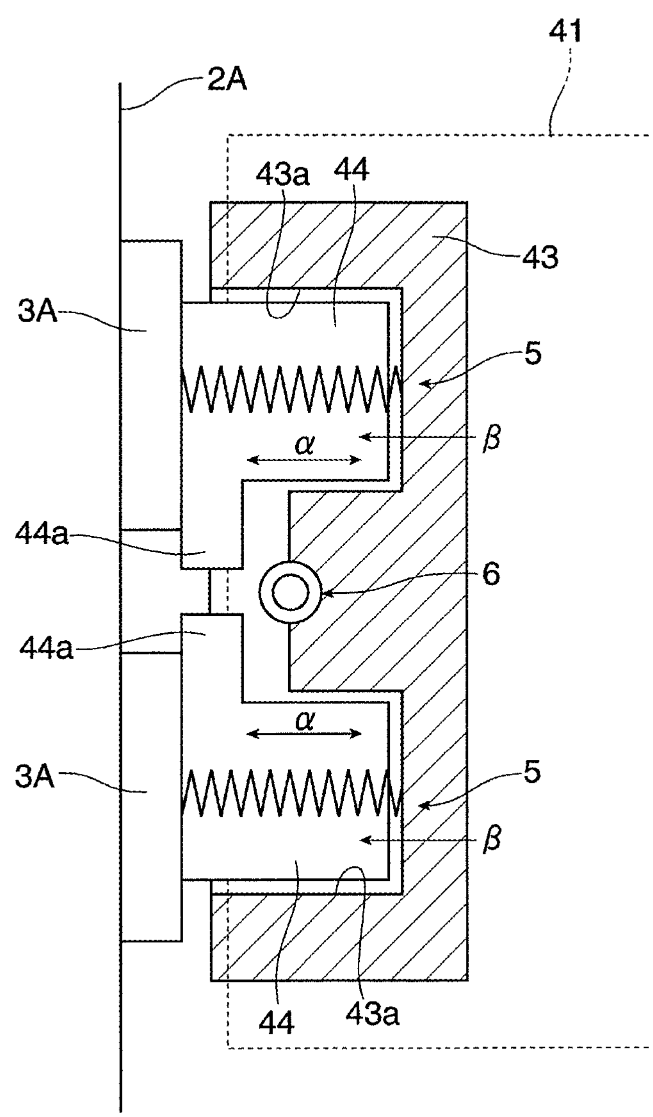
FIG. 5 is a schematic view for illustrating a first embodiment of a mounting and dismounting mechanism for a movable body in the moving unit according to the present invention.

FIG. 5 is a plan view for illustrating a first embodiment of the mounting and dismounting mechanism. The first moving blocks 3A traveling on the first track rail 2A are respectively fixed to the retaining plates 44. Each of the retaining plates 44 is provided so as to be freely slidable in the direction indicated by the arrowed line α with respect to the movable body 41. Specifically, a guiding plate 43 is fixed onto the movable body 41. The retaining plates 44 are respectively accommodated in slit spaces 43*a* formed in the guiding plate 43. Each of the retaining plates 44 is freely movable only in the direction indicated by the arrowed line α inside the slit space 43*a*. An elastic member 5 is provided inside each of the slit spaces 43*a*. Each of the elastic members 5 urges the retaining plate 44 in a direction of pressing the moving block 3A against the first track rail 2A (direction indicated by the arrowed line β). Under a state in which the movable body is dismounted from the track rails 2A and 2B, the interval between the first moving block 3A and the second moving block 3B is set larger than an interval between the first track rail 2A and the second track rail 2B.

Therefore, the interval between the moving blocks 3A traveling on the track rail 2A and the moving blocks 3B traveling on the track rail 2B changes through movement of the retaining plates 44 inside the slit spaces 43*a* in the direction indicated by the arrowed lines α. As a result, the movable body 41 can be freely mounted to or dismounted from the pair of track rails 2A and 2B laid on the ceiling plate 101 at a constant interval therebetween.

Figure 6:
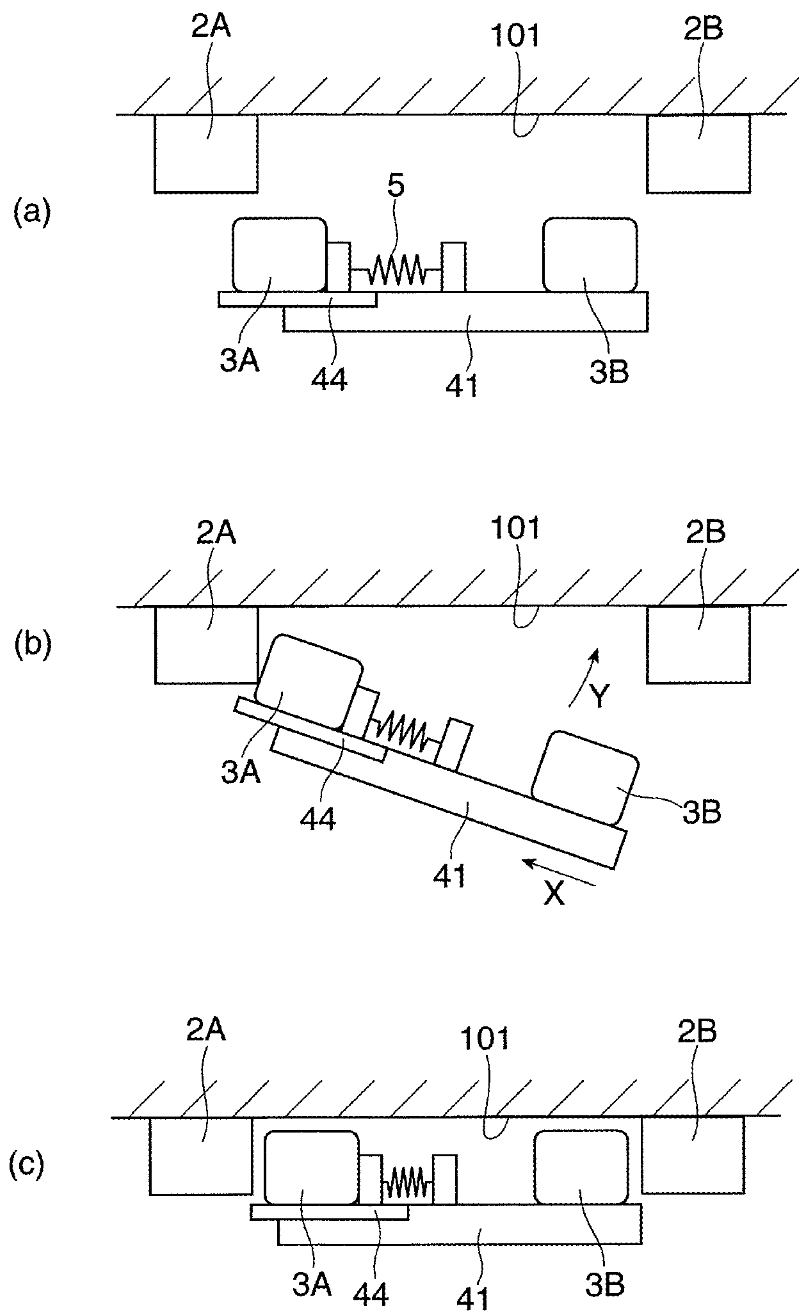
FIG. 6 are views for illustrating a procedure of mounting and dismounting the movable body to and from the track rails.

FIG. 6 are schematic views for illustrating a procedure of mounting the movable body with the mounting and dismounting mechanism according to the first embodiment. As illustrated in FIG. 6(*a*), under a state in which the movable body 41 and the track rails 2A and 2B are separated from each other, the interval between the first moving block 3A and the second moving block 2B is larger than the interval between the first track rail 2A and the second track rail 2B under a function of the elastic member. When the first moving block 3A is brought into contact with the first track rail 2A in a state in which the movable body 41 is inclined and the movable body 41 is then pressed toward the first track rail 2A (arrowed line X) as illustrated in FIG. 6(*b*), the retaining plate 44 is pressed onto the movable body 41 against the urging force of the elastic member 5. As a result, the interval between the first moving block 3A and the second moving block 3B can be reduced. Thereafter, by moving up the movable body 41 so that the second moving block 3B is brought into contact with the second track rail 2B, the movable body 41 can be inserted between the pair of track rails 2A and 2B (arrowed line Y) as illustrated in FIG. 6(*c*). Then, when a force of pressing the movable body 41 against the first track rail 2A is released, the interval between the first moving block 3A and the second moving block 3B is increased by the urging force of the elastic member 5, thereby completing the mounting of the movable body 41 to the track rails 2A and 2B. Further, by performing a reverse operation, the movable body can be dismounted from the track rails 2A and 2B. Specifically, an operator can mount and dismount the movable body to and from the track rails 2A and 2B while holding the movable body 41 with both hands.

On the other hand, when the force of pressing the movable body 41 in the direction toward the first track rail 2A is unintentionally exerted on the movable body 41 under a state in which the movable body 41 is mounted to the track rails 2A and 2B as illustrated in FIG. 6(*c*), there is a risk in that the movable body 41 may drop off from the track rails 2A and 2B. In order to prevent occurrence of such an accident, a lock member 6 configured to restrict movement of the retaining plates 44 can be provided to the guiding plate 43, as illustrated in FIG. 5.

The lock member 6 is a bar-like member protruding from the movable body 41 toward a side opposite to the ceiling panel 101, and is provided to the guiding plate 43 so as to be freely movable in an axial direction (direction perpendicular to the drawing sheet of FIG. 5). Further, a lock effecting portion 44*a* is provided to each of the retaining plates 44 to which the first moving block 3A is fixed. The lock effecting portion 44*a* interferes with the lock member 6 when the retaining plate 44 is pressed into the slit spaces 43*a* of the guiding plate 43.

Figure 7:
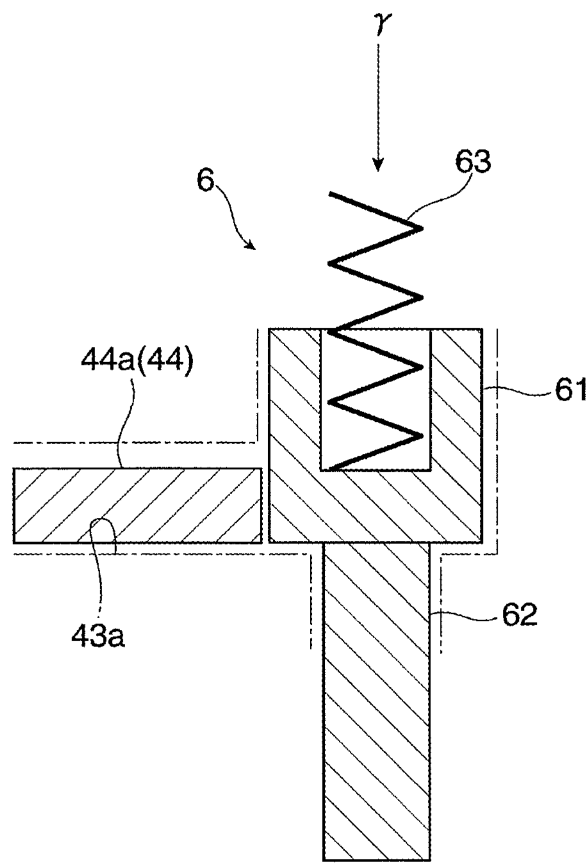
FIG. 7 is a schematic view for illustrating a lock member for the movable body according to the first embodiment.
Figure 8:
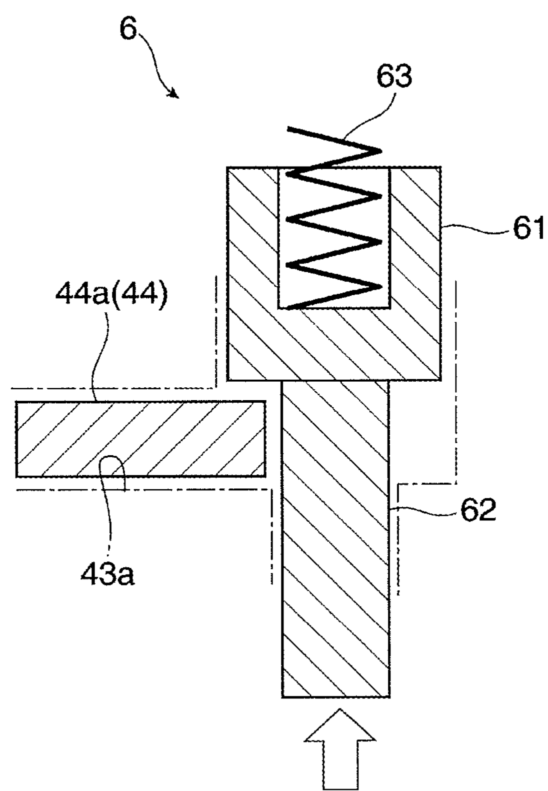
FIG. 8 is a schematic view for illustrating a release state of the lock member illustrated in FIG. 7.

FIG. 7 and FIG. 8 are views for illustrating a relationship between the lock member 6 and the retaining plate 44. The lock member 6 includes a shaft portion 62 that projects from the guiding plate 43 and passes through the movable body 41, an engaging cylindrical portion 61 provided to a distal end of the shaft portion 62, which has a diameter larger than that of the shaft portion, and a coil spring 63 configured to urge the lock member 6 in the axial direction (direction indicated by the arrowed line γ in FIG. 7). As illustrated in FIG. 7, in general, the lock member 6 is pressed in the direction indicated by the arrowed line γ by an urging force exerted by the coil spring 63, and hence the engaging cylindrical portion 61 is present inside the slit spaces 43*a* of the guiding plate 43. At this time, the lock effecting portion 44*a* of the retaining plate 44 to which the first moving block 3A is fixed interferes with the engaging cylindrical portion 61. Therefore, the retaining plate 44 cannot move into the slit opening portion 43*a*. Therefore, under a state in which no external force is applied to the lock member 6, even when the operator pushes the movable body 41 toward the track rail 2A, the lock member 6 and the retaining plate 44 interfere with each other, and therefore the retaining plate 44 to which the first moving block 3A is fixed cannot be pressed into the movable body 41. Thus, the movable body 41 is inhibited from being dismounted from the pair of track rails 2A and 2B.

On the other hand, when a pressing force (indicated by the outline arrow in FIG. 8) against the urging force of the coil spring 63 is applied to the shaft portion 62 of the lock member 6, the engaging cylindrical portion 61 of the safety lock member 6 retreats from the slit spaces 43*a* of the guiding plate 43. Therefore, the retaining plate 44 can move into the slit spaces 43*a* by the amount of a difference in diameter between the engaging cylindrical portion 61 and the shaft portion 62. Specifically, when the operator presses the shaft portion 62 of the lock member 6, the interference between the lock member 6 and the retaining plates 44 is cancelled. By pressing the movable body 41 against the first track rail 2A, the retaining plates 44 can be pressed into the movable body 41. Therefore, while the shaft portion 62 of the lock member 6 is being pressed, the movable body 41 can be dismounted from the track rails 2A and 2B.

Figure 9:
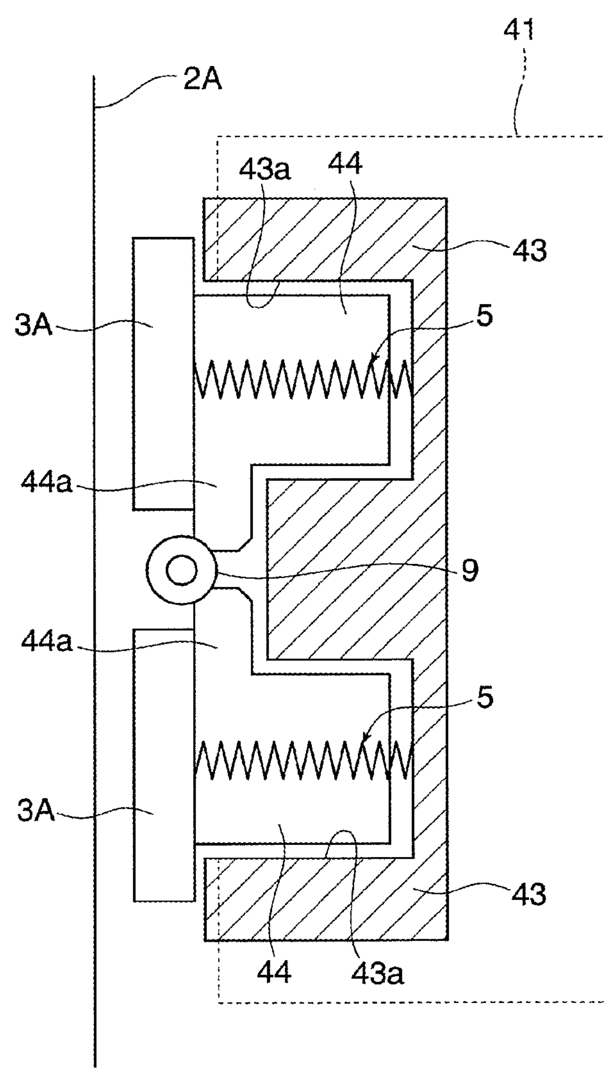
FIG. 9 is a schematic view for illustrating a second embodiment of the mounting and dismounting mechanism for the movable body in the moving unit according to the present invention.

On the other hand, FIG. 9 is a view for illustrating a second embodiment of the mounting and dismounting mechanism for the movable body 41 to and from the track rails 2A and 2B. In this embodiment, in order to facilitate work of mounting the movable body 41 to the pair of track rails 2A and 2B, there is provided a temporary fixing member 9 configured to maintain a state in which the retaining plates 44 are pulled into the slit spaces 43*a* of the movable body 41. The temporary fixing member 9 also serves as the above-mentioned lock member 6, and therefore functions as the temporary fixing member 9 when the retaining plates 44 are pulled into the slit spaces 43*a* against the urging forces of the elastic members while functioning as the above-mentioned lock member 6 after the movable body is mounted to the track rails 2A and 2B. Therefore, a specific configuration of the temporary fixing member 9 is the same as the configuration of the lock member 6 illustrated in FIG. 7, and detailed description thereof is herein omitted.

Figure 10:
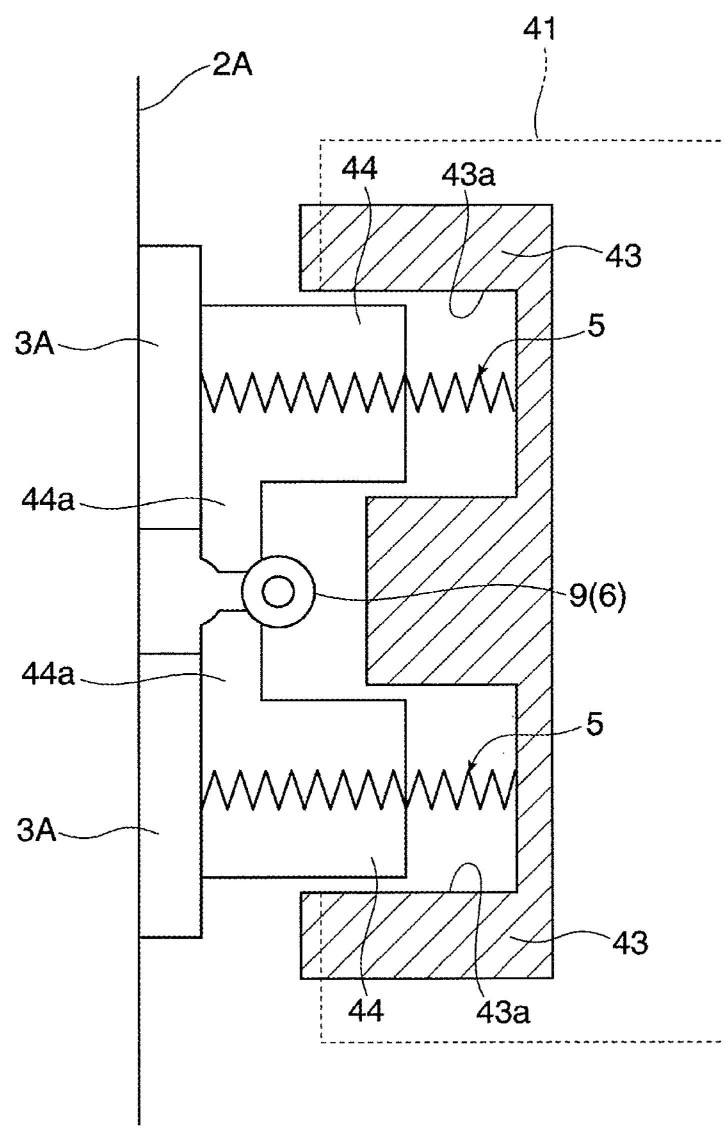
FIG. 10 is a schematic view for illustrating the mounting and dismounting mechanism illustrated in FIG. 9 under a state in which the moving blocks are mounted to the track rail.

As illustrated in FIG. 9, under a state in which the retaining plates 44 are pulled into the slit spaces 43*a* of the guiding plate 43 against the urging forces of the elastic members 5, the engaging cylindrical portion 61 of the temporary fixing member 9 interferes with front end edges of the lock effecting portions 44*a* of the retaining plates 44. Therefore, the retaining plates 44 cannot move out of the slit spaces 43*a* toward the first track rail 2A. As a result, the first moving blocks 3A are retained in positions separated away from the first track rail 2A. Then, when the temporary fixing member 9 is pressed in this state, the interference between the engaging cylindrical portion 61 and the lock effecting portions 44*a* of the retaining plates 44 is cancelled. As a result, the retaining plates 44 are pushed out of the slit spaces 43*a* of the guiding plate 43 by the urging forces of the elastic members 5. As a result, as illustrated in FIG. 10, the first moving blocks 3A are brought into contact with the track rail 2A by the urging forces of the elastic members 5. Further, when the pressing on the temporary fixing member 9 is cancelled after the first moving blocks 3A are brought into contact with the first track rail 2A, the engaging cylindrical portion 61 of the temporary fixing member 9 interferes with rear end edges of the lock of effecting portions 44*a* of the retaining plates 44. Therefore, the retaining plates 44 cannot return back into the slit spaces 43*a* of the retaining plate 44. Thus, the first moving blocks 3A are maintained in a state of being in contact with the track rail 2A.

Therefore, as preparatory work for mounting the movable body 41 to the track rails 2A and 2B, the retaining plates 44 are first pressed toward the movable body 41 while the temporary fixing member 9 is being pressed. When the pressing of the temporary fixing member 9 is cancelled in this state, the retaining plates 44 and the first moving blocks 3A are retained in the positions where the retaining plates 44 and the first moving blocks 3A are currently present. Specifically, a state in which the interval between the first moving blocks 3A and the second moving blocks 3B becomes narrower than the interval between the track rails 2A and 2B is maintained. Therefore, unstable work of pressing the movable body 41 obliquely to the first track rail 2A as illustrated in FIG. 6 is not needed. Correspondingly, the movable body 41 can be mounted easily to the track rails 2A and 2B.

Figure 11:
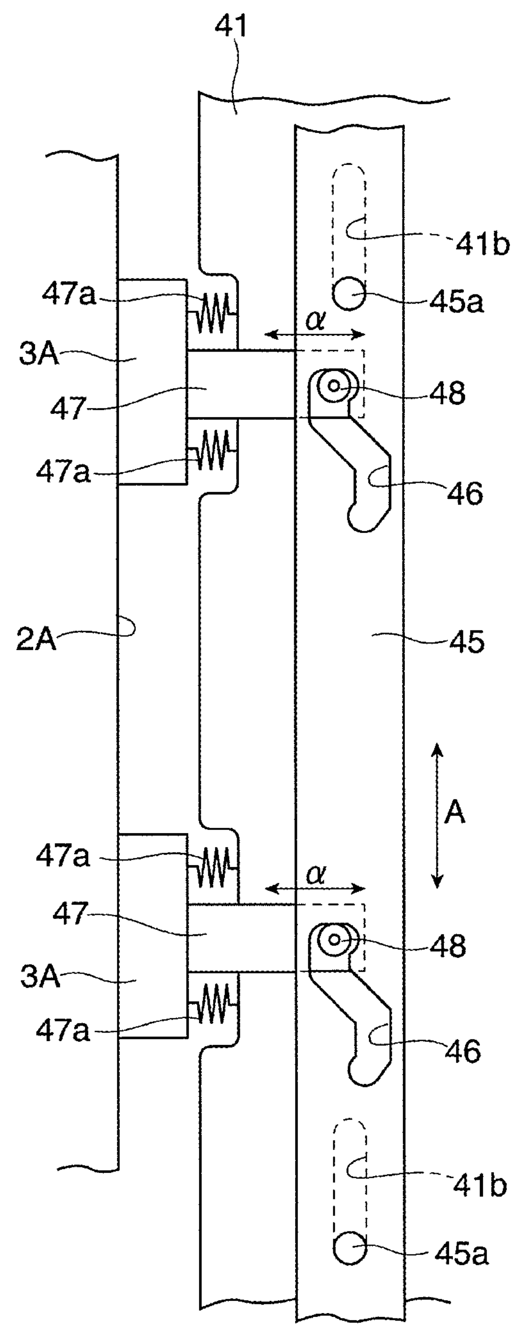
FIG. 11 is a schematic view for illustrating a third embodiment of the mounting and dismounting mechanism for the movable body in the moving unit according to the present invention.

FIG. 11 is a view for illustrating a third embodiment of the mounting and dismounting mechanism. In the third embodiment, the first moving blocks 3A are set in any one of mounted positions where the first moving blocks 3A are held in contact with the track rail 2A and retreated positions where the first moving blocks 3A are separated away from the track rail in accordance with an operation of a release lever 45 mounted to the movable body 41. The release lever 45 includes pins 45*a*. The pins 45*a* are fitted into slits 41*b* formed in the movable body 41. Therefore, the release lever 45 is freely movable in a direction indicated by the arrowed line A along a surface of the movable body 41 by a length of each of the slits 41*b*. Further, a length of the release lever 45 is set larger than a length of the movable body 41 along the track rail 2A. When the release lever 45 is moved along the slits 41*b*, anyone of end portions of the release lever 45 in a longitudinal direction projects far from the movable body 41. The release lever 45 functions as a plate cam, and includes cam grooves 46 formed so as to correspond to the individual moving blocks 3A on which the movable body is retained. The moving blocks 3A are respectively fixed to distal ends of retaining plates 47. The retaining plates 47 are retained so as to be freely movable in the direction a with respect to the movable body 41, and are respectively urged by elastic members 47*a* in a direction of projecting from the movable body 41. A rotating roller 48 is provided to a rear end of each of the retaining plates 47. The rotating roller 48 is fitted into the cam groove 46 of the release lever 45.

FIG. 11 is a view for illustrating a state in which the first moving blocks 3A are set in the mounted positions. When the release lever 45 is moved in this state, the rotating rollers 48 provided to the rear ends of the retaining plates 47 roll inside the cam grooves 46, and hence the retaining plates 47 are pulled back by the movable body 41 against urging forces of the elastic members 47*a*. Specifically, in the mounting and dismounting mechanism according to the third embodiment, the rotating rollers 48 move along the cam grooves 46 through the operation of the release lever 45 to allow the first moving blocks 3A to be set in any one of the mounted positions where the first moving blocks 3A are held in contact with the track rail 2A and the retreated positions where the first moving blocks 3A are separated away from the track rail 2A. Whether the first moving blocks 3A are set in the mounted positions or the retreated positions is determined uniquely through the operation of the release lever 45. Therefore, the elastic members 47*a* function as precompressing members configured to reliably bring the first moving blocks 3A set in the mounted positions into contact with the first track rail 2A. Therefore, the first moving blocks 3A are not moved from the retreated positions to the mounted positions by the urging forces of the elastic members 47*a* described above.

As described above, the release lever 45 has any one of the longitudinal end portions, which projects far from the movable body 41. Hence, the operator can operate the release lever 45 with fingertips while gripping the movable body 41 with both hands. Therefore, according to the mounting and dismounting mechanism of the third embodiment, the movable body 41 can be more easily mounted to or dismounted from the track rails 2A and 2B. As a result, working efficiency can be enhanced.

Further, the first moving blocks 3A that are set in the mounted positions are not unintentionally set in the retreated positions and the first moving blocks 3A that are held in the retreated positions do not move to the mounted positions unless the release lever 45 is operated. Specifically, the release lever 45 has functions as both the temporary fixing member 9 and the safety lock member 6 described above.

Figure 12:
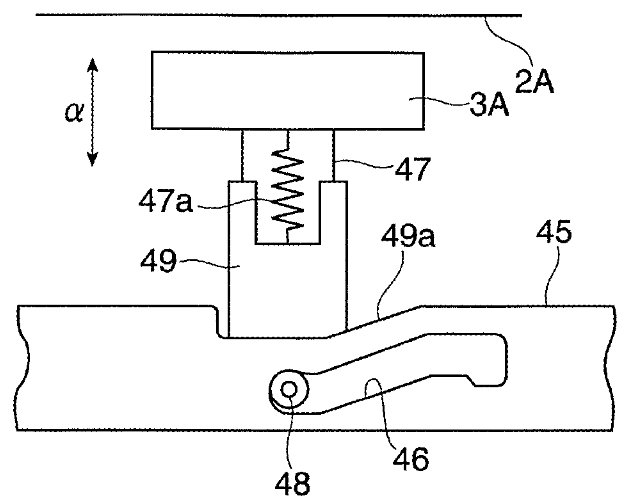
FIG. 12 is a schematic view for illustrating a variation of the mounting and dismounting mechanism in the third embodiment.

FIG. 12 is a view for illustrating a variation of the mounting and dismounting mechanism illustrated in FIG. 11. In the mounting and dismounting mechanism illustrated in FIG. 11, the elastic member 47*a* is provided in a compressed state between the moving block 3A and the movable body 41. When the moving block 3A moves in the direction indicated by the arrowed line α so that the setting thereof is changed from the retreated position to the mounted position, the elastic member 47*a* is expanded correspondingly. Even in the mounted position, the elastic member 47*a* still remains in the compressed state. The elastic member 47*a* fulfills the function of pressing the moving block 3A against the track rail 2A. However, the expansion occurs when the elastic member 47*a* in the retreated position is set to the mounted position. Therefore, when the urging force of the elastic member 47*a* in the retreated position and that in the mounted position are compared with each other, the urging force in the retreated position becomes disadvantageously larger than that in the mounted position. Thus, the pressing force on the moving block against the track rail 2A is far from being fully exerted.

Therefore, in the variation illustrated in FIG. 12, an auxiliary sliding member 49 configured to move along with the operation of the release lever 45 is provided. The elastic member 47*a* is provided between the auxiliary sliding member 49 and the moving block 3A. The auxiliary sliding member 49 is provided so as to overlap the retaining plate 47 that supports the moving block 3A, and is freely slidable in the direction indicated by the arrowed line α in FIG. 12 similarly to the retaining plate. However, the auxiliary sliding member 49 is supported on the movable body 41 independently of the retaining plate 47, and slides in the direction indicated by the arrowed line α independently of the retaining plate 47. Further, a slide surface 49*a* configured to guide the auxiliary sliding member is formed on the release lever 45. The slide surface 49*a* is formed along the cam groove 46. The elastic member 47*a* is provided between the moving block 3A and the auxiliary sliding member 49. In addition, the retaining plate 47 that supports the moving block 3A is restrained in the cam groove 46 through intermediation of the rotating roller 48. Therefore, the auxiliary sliding member 49 is pressed against the slide surface 49*a* of the release lever 45 by the urging force of the elastic member 47*a*. Specifically, the elastic member 47*a* is held in a compressed state between the auxiliary sliding member 49 and the moving block 3A.

Figure 13:
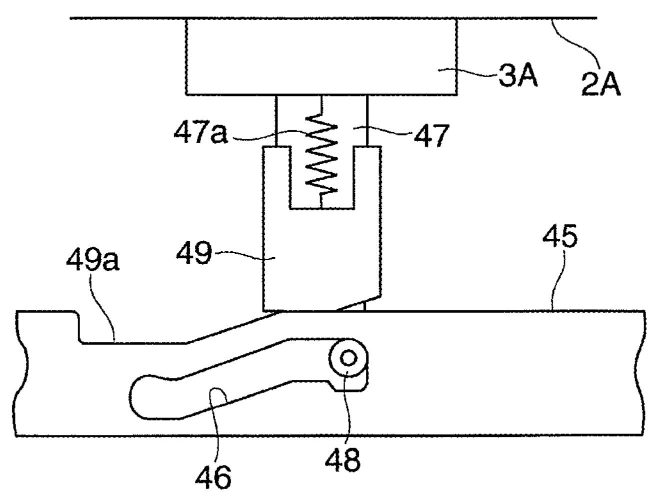
FIG. 13 is a schematic view for illustrating the mounting and dismounting mechanism illustrated in FIG. 12 under a state in which the moving block is set in a mounted position.

FIG. 13 is a view for illustrating a state in which the release lever 45 is operated to set the moving block 3A in the mounted position on the track rail 2A and for illustrating a state in which the release lever is moved to the left on the drawing sheet in comparison with FIG. 12. When the rotating roller 48 moves inside the cam groove 46 along with the operation of the release lever 45 to move the moving block 3A from the movable body 41 toward the track rail 2A, the auxiliary sliding member 49 also moves toward the track rail 2A while being pressed by the slide surface 49*a*. Therefore, even when the moving block 3A moves from the retreated position to the mounted position, significant expansion does not occur in the elastic member 47*a* that is provided between the moving block 3A and the auxiliary sliding member 49. As a result, the urging force of the elastic member 47*a* can be prevented from being lowered.

Therefore, according to the mounting and dismounting mechanism illustrated in FIG. 12 and FIG. 13, the urging force of the elastic member 47*a* is reliably exerted on the moving block 3A that is set in the mounted position so that the moving block 3A can be reliably brought into contact with the track rail 2A.

Next, description is made of a positioning mechanism for fixing the movable body 41 at specific positions on the track rails 2A and 2B.

As described above, the movable body 41 can be freely moved along the longitudinal direction of the track rails 2A and 2B. However, it is conceived that, in many situations of practical use of the movable body 41, the movable body 41 is not used while being moved with respect to the track rails 2A and 2B, but the movable body 41 is used while being fixed at the specific positions on the track rails 2A and 2B as described above by way of the example of the use in the passenger cabin 100 of an aircraft. Thus, the positioning mechanism may be provided to the movable body 41. This positioning mechanism is configured to restrict movement of the movable body 41 by using the fixing holes 26 formed at predetermined intervals along the track rail 2A or 2B. The operator can fix the movable body 41 at arbitrary positions corresponding to the fixing holes 26 by moving the movable body 41 to specific positions on the track rails 2A and 2B, and then operating this positioning mechanism.

Figure 14:
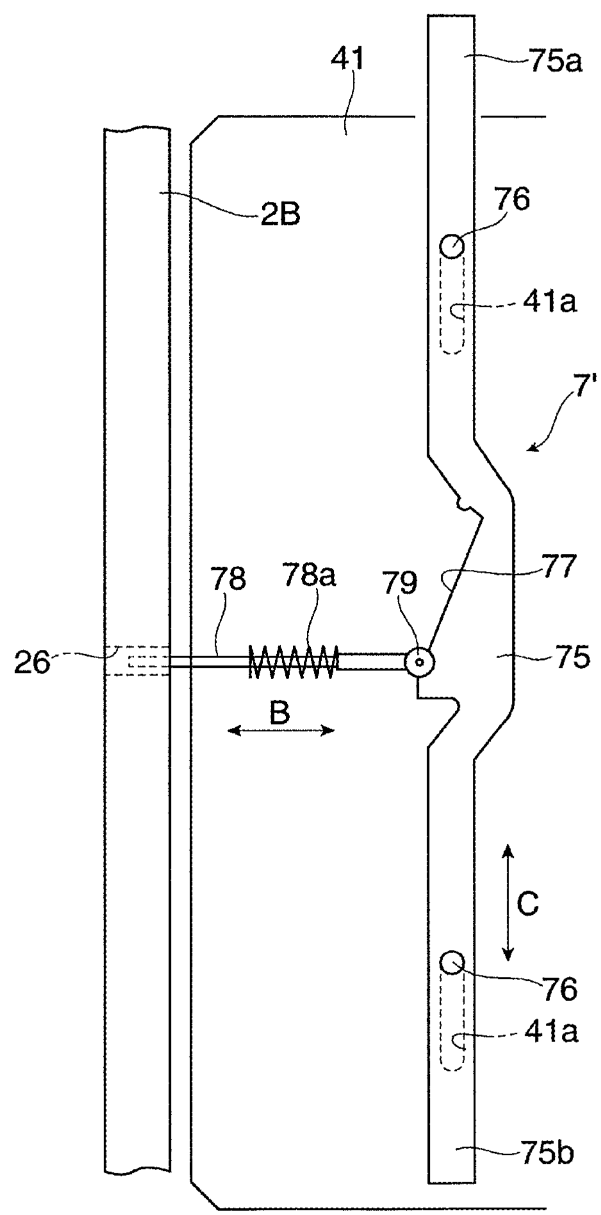
FIG. 14 is a schematic view for illustrating a positioning mechanism for the movable body.

FIG. 14 is a view for illustrating an embodiment of the positioning mechanism. In the positioning mechanism, a setting lever 75 functioning as a plate cam is provided to the movable body 41. The setting lever 75 includes pins 76. The pins 76 are fitted into slits 41*a* formed in the movable body. Accordingly, the setting lever 75 is freely movable in a direction indicated by the arrowed line C along the surface of the movable body 41 by a length of each of the slits 41*a*. Further, a length of the setting lever 75 is set slightly larger than the length of the movable body 41 along the track rail 2B. When the setting lever 75 is moved along the slits 41*a*, any one of end portions 75*a* and 75*b* of the setting lever 75 in a longitudinal direction projects from the movable body 41. A cam surface 77 that is inclined with respect to a direction of the movement of the setting lever 75 is formed on the setting lever 75.

An engaging pin 78 is provided to the movable body 41 so as to be freely movable along a direction indicated by the arrowed line B. A distal end of the engaging pin 78 is inserted into and retreated from the fixing hole 26 formed in the track rail 2B in accordance with the movement of the engaging pin 78. A rotating roller 79 is provided to a rear end of the engaging pin 78. The rotating roller 79 is held in contact with the cam surface 77 of the setting lever 75. Further, the engaging pin is urged by a coil spring 78*a* in a direction away from the track rail 2B, in other words, in a direction closer to the setting lever 75 so that the rotating roller 79 is constantly held in contact with the cam surface 77 of the setting lever 75.

FIG. 14 is a view for illustrating a state in which the distal end of the engaging pin 78 is inserted into the fixing hole 26 of the second track rail 2B to inhibit the movement of the movable body 41 with respect to the track rails 2A and 2B. Specifically, the cam surface 77 of the setting lever 75 presses the engaging pin 78 against the second track rail 2B, and hence the coil spring 78*a* is in a contracted state. When the end portion 75*a* of the setting lever 75 is pushed in this state to move the setting lever 75, the rotating roller 79 provided to the rear end of the engaging pin 78 rolls on the cam surface 77, and hence the distal end of the engaging pin 78 is retreated from the fixing hole 26 of the second track rail 2B. As a result, the fixation of the movable body 41 to the track rails 2A and 2B is cancelled to allow the movable body 41 to freely move along the track rails 2A and 2B.

Further, in a state in which the engaging pin 78 is retreated from the fixing hole 26 of the second track rail 2B, the end portion 75*b* of the setting lever 75 projects from the movable body 41. Therefore, when the end portion 75*b* is pushed to move the setting lever 75, the engaging pin 78 is inserted into the fixing hole 26 of the second track rail 2B to fix the movable body 41 to the track rail 2B. Specifically, by pushing the end portion of the setting lever 75, which projects beyond an outer edge of the movable body 41, the movable body 41 is fixed or released. Therefore, the operator can operate the setting lever 75 with fingertips to enable the fixation or release of the movable body 41 to or from the track rails 2A and 2B while gripping the movable body 41 with both hands. As a result, working efficiency can be enhanced.

Figure 15:
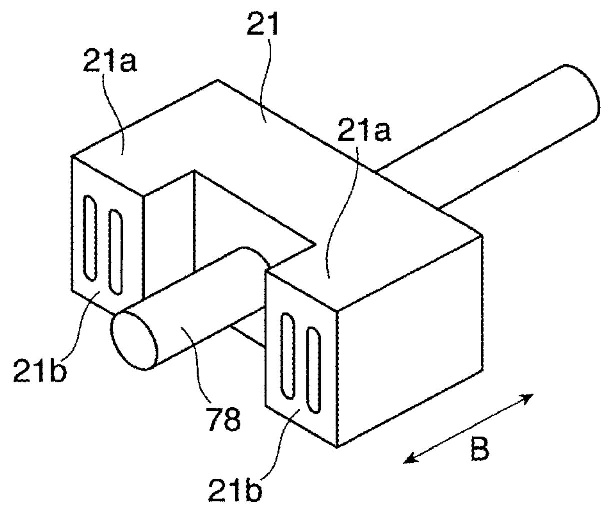
FIG. 15 is a perspective view for illustrating an anti-vibration member included in the positioning mechanism for the movable body.

FIG. 15 is a view for illustrating an anti-vibration member 21 of the positioning mechanism. In order to smoothly insert the engaging pin 78 into the fixing hole 26 of the track rail 2B, an inner diameter of the fixing hole 26 is required to be set slightly larger than an outer diameter of the engaging pin 78. Therefore, a gap between the fixing hole 26 and the engaging pin 78 inserted into the fixing hole 26 cannot be fully eliminated. Thus, even when the positioning mechanism illustrated in FIG. 14 is operated to fix the movable body 41 to the track rails 2A and 2B, there is a fear in that vibration and noise, which correspond to the size of the gap, are generated in the movable body 41. For this reason, the anti-vibration member 21 made of a rubber is fixed to the engaging pin 78. The engaging pin 78 passes through the anti-vibration member 21 that includes a pair of damping portions 21*a* provided so as to be adjacent to the engaging pin 78. The damping portions 21*a* project toward the track rail 2B. A pressure-receiving surface 21*b* to be held in contact with the track rail 2B is formed on a distal end of each of the damping portions 21*a*. Further, a distal end of the engaging pin 78 further projects beyond the pressure-receiving surfaces 21*b*. In a state in which the pressure-receiving surfaces 21*b* are pressed against a side surface of the track rail 2B, the distal end of the engaging pin 78 is inserted into the fixing hole 26 of the track rail 2B.

In the positioning mechanism including the anti-vibration member 21, when the engaging pin 78 is inserted into the fixing hole 26 of the track rail 2B, the pressure-receiving surfaces 21*b* of the anti-vibration member 21 are pressed against the track rail 2B to compress the damping portions. Therefore, a damping effect through frictional resistance on the receiving surfaces 21*b* and a damping effect through deformation of the damping portions 21*a* can be obtained for rattle of the movable body 41. As a result, the generation of vibration and noise in the movable body 41 can be effectively suppressed.

Figure 16:
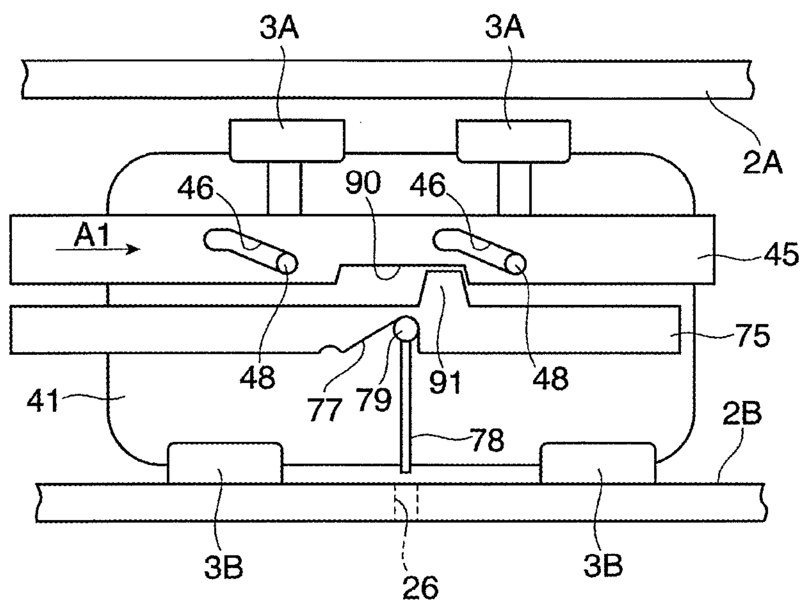
FIG. 16 is a schematic view for illustrating a fourth embodiment of the mounting and dismounting mechanism for the movable body in the moving unit according to the present invention.
Figure 17:
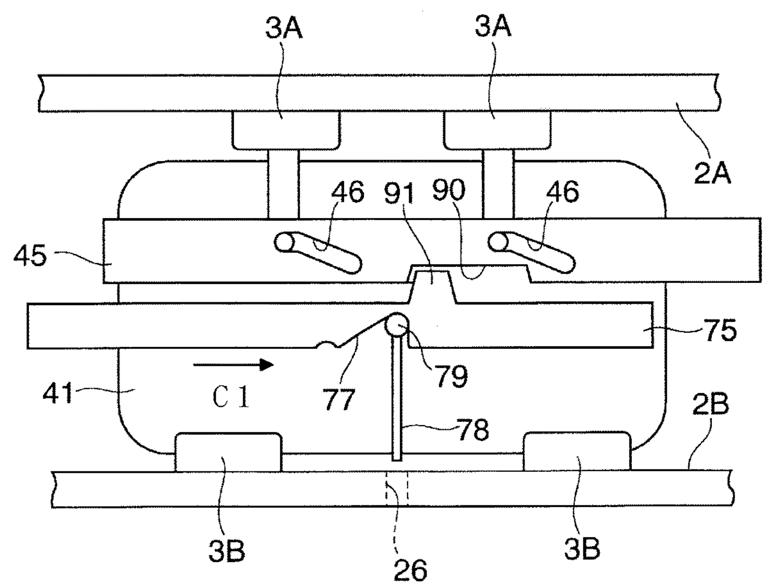
FIG. 17 is a schematic view for illustrating the mounting and dismounting mechanism illustrated in FIG. 16 under a state in which the moving blocks are mounted to the track rail.

FIG. 16 and FIG. 17 are views for illustrating a fourth embodiment of the present invention. There is illustrated a structure in which both the mounting and dismounting mechanism and the positioning mechanism described above are mounted to the movable body 41 and these mechanisms are interlinked with each other so as to prevent an error in the operation by the operator. As the reference symbols in FIG. 16 and FIG. 17, the same reference symbols as those of the configurations that are already described referring to FIG. 11 and FIG. 14 are given.

In the drawings, the four moving blocks 3A and 3B traveling on the track rails 2A and 2B are provided on the movable body 41. The moving blocks 3B are fixed onto the movable body, whereas the movable blocks 3A are selectively set in any one of the retreated positions and the mounted positions by the mounting and dismounting mechanism illustrated in FIG. 11. The moving blocks 3A are set in the mounted positions or the retreated positions by the operation of the release lever 45. By moving the release lever 45 in a direction indicated by the arrowed line A1 in FIG. 16, the moving blocks 3A are assembled to the track rail 2A so that the movable body 41 can be mounted to the pair of track rails 2A and 2B. Further, when the release lever 45 is moved in a direction opposite thereto, the moving blocks 3A are separated away from the track rail 2A so that the movable body 41 can be dismounted from the pair of track rails 2A and 2B. This point is the same as in the third embodiment of the mounting and dismounting mechanism illustrated in FIG. 11.

On the other hand, the positioning mechanism is provided to the movable body 41. By inserting the engaging pin 78 into the fixing hole 26 of the track rail 2B, the movable body 41 is fixed at specific positions on the track rails 2A and 2B. The engaging pin 78 is inserted into and retreated from the fixing hole 26 through the operation of the setting lever 75. By moving the setting lever 75 in a direction indicated by the arrowed line C1 in FIG. 17, the engaging pin 78 moves toward the track rail 2B so that the distal end of the engaging pin 78 is inserted into the fixing hole 26 of the track rail 2B. As a result, the movable body 41 can be fixed to the pair of track rails 2A and 2B. Further, when the setting lever 75 is moved in a direction opposite thereto, the engaging pin 78 is retreated from the fixing hole 26 of the track rail 2B so that the movable body 41 can be freely moved with respect to the pair of track rails 2A and 2B. This point is the same as in the positioning mechanism illustrated in FIG. 14.

The mounting and dismounting mechanism and the positioning mechanism are provided between the ceiling panel 101 being the fixed portion and the movable body 41.

As illustrated in FIG. 16, the release lever 45 and the setting lever 75 are provided in parallel to each other. Further, a regulating groove 90 is formed on the release lever 45, whereas a regulating projection 91 is formed on the setting lever 75. The regulating projection 91 of the setting lever 75 is inserted in the regulating groove 90 of the release lever 45. A width of the regulating groove 90 of the release lever 45 is set larger than a width of the regulating projection 91 of the setting lever 75. In accordance with a positional relationship between the regulating groove 90 and the regulating projection 91, the movement of the release lever 45 or the movement of the setting lever 75 is restricted.

FIG. 16 is a view for illustrating a state before the movable body 41 is mounted to the pair of track rails 2A and 2B. The release lever 45 is set so as to correspond to the retreated positions of the moving blocks 3A, and the interval between the moving blocks 3A and the moving blocks 3B is set smaller than the interval between the pair of track rails 2A and 2B. Hence, the operator can insert the movable body 41 between these track rails 2A and 2B while holding the movable body 41 with both hands. At this time, the setting lever 75 is set so as to correspond to a retreated position of the engaging pin 78, and therefore the distal end of the engaging pin 78 is separated away from the track rail 2B. Further, in this state, even if the setting lever 75 is forced to move so as to insert the engaging pin 78 into the fixing hole 26 of the track rail 2B, the regulating projection 91 of the setting lever 75 abuts against the regulating groove 90 of the release lever 45 so that the setting lever 75 cannot be moved. Therefore, in a stage before the operation of the release lever 45 in the direction indicated by the arrowed line A1, specifically, in a stage before the assembly of the movable body 41 to the pair of track rails 2A and 2B, the operation of the setting lever 75 is inhibited. As a result, during the work of assembly of the movable body 41 to the pair of track rails 2A and 2B, an erroneous operation of moving the engaging pin 78 by error can be prevented.

FIG. 17 is a view for illustrating a state in which the movable body 41 is assembled to the pair of track rails 2A and 2B through the operation of the release lever 45. The release lever 45 is set so as to correspond to the mounted positions of the moving blocks 3A. The release lever 45 is set from the retreated position to the mounted position, and hence the regulating groove 90 of the release lever 45 moves to the right on the drawing sheet of FIG. 17 with respect to the regulating projection 91 of the setting lever 75. Therefore, in this state, the setting lever 75 can be moved in the direction indicated by the arrowed line C1. As a result, the engaging pin 78 is inserted into the fixing hole 26 of the track rail 2B, and hence the movable body 41 is immovable with respect to the track rails 2A and 2B.

On the other hand, in consideration of a case where the movable body 41 is dismounted from the pair of track rails 2A and 2B, even when the release lever 45 is forced to return to the retreated position (position illustrated in FIG. 16) in the state in which the engaging pin 78 is inserted into the fixing hole 26 of the track rail 2B, the regulating groove 90 of the release lever 45 interferes with the regulating projection 91 of the setting lever 75. Therefore, the release lever 45 cannot be set from the mounted position to the retreated position. Specifically, as in the state illustrated in FIG. 17, the release lever 45 can be operated only after the setting lever 75 is operated to withdraw the engaging pin 78 from the fixing hole 26 of the track rail 2B. Thus, the moving blocks 3A cannot be returned back to the retreated positions.

Specifically, when the movable body 41 is dismounted from the track rails 2A and 2B, the setting lever 75 is first required to be operated to withdraw the engaging pin 78 from the fixing hole 26 of the track rail 2B. After the operation is performed, the release lever 45 is operated to set the moving blocks 3A in the retreated positions. Therefore, an erroneous operation of dismounting the movable body 41 from the pair of track rails 2A and 2B in a state in which the engaging pin 78 remains inserted in the fixing hole 26 of the track rail 2B can be prevented.

Figure 18:
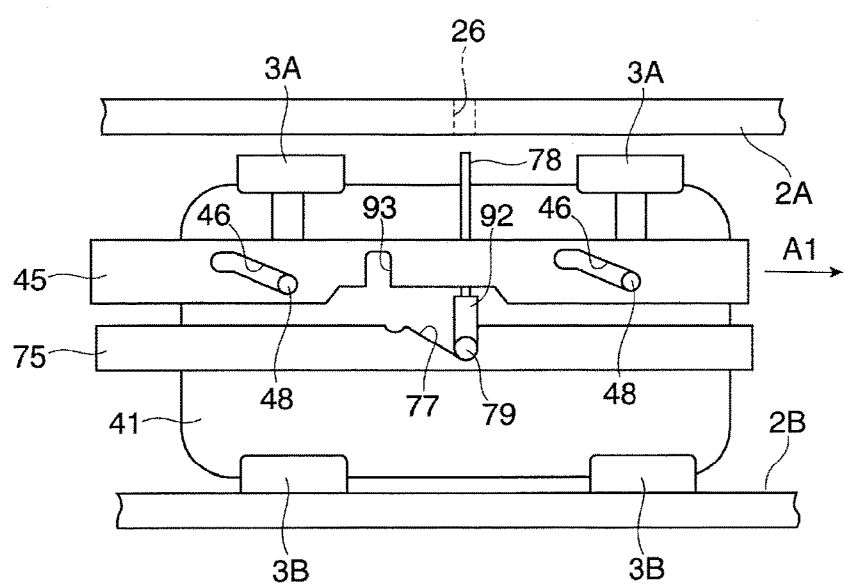
FIG. 18 is a schematic view for illustrating a fifth embodiment of the mounting and dismounting mechanism for the movable body in the moving unit according to the present invention.
Figure 19:
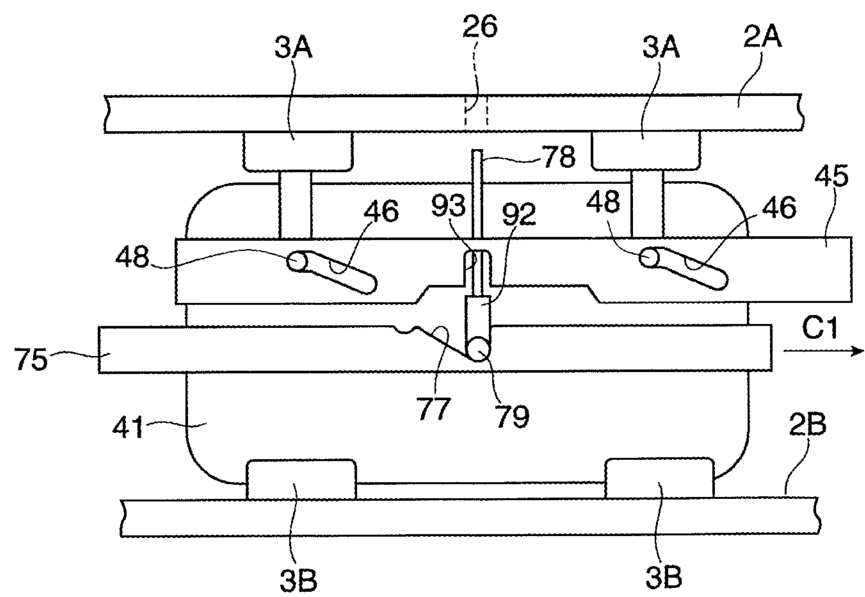
FIG. 19 is a schematic view for illustrating the mounting and dismounting mechanism illustrated in FIG. 18 under a state in which the moving blocks are mounted to the track rail.

FIG. 18 and FIG. 19 are views for illustrating a fifth embodiment of the present invention where an erroneous-operation preventing mechanism of the fourth embodiment described above is further developed.

Basic configurations of the mounting and dismounting mechanism and the positioning mechanism for the movable body 41 according to the fifth embodiment are the same as those of the fourth embodiment described above. However, the engaging pin 78 of the positioning mechanism is not inserted into and retreated from the fixing hole 26 of the track rail 2B, but is inserted into and retreated from the fixing hole 26 of the track rail 2A across the release lever 45 of the mounting and dismounting mechanism. Further, a restricting member 92 having an approximately rectangular shape is fixed to the engaging pin 78. The restricting member 92 is configured to be selectively fitted into a groove 93 formed on the release lever 45 through the operation of the setting lever 75 of the positioning mechanism.

The moving blocks 3A are set in the mounted positions or the retreated positions with respect to the track rail 2A through the operation of the release lever 45. By moving the release lever 45 in the direction indicated by the arrowed line A1 in FIG. 18, the moving blocks 3A are assembled to the track rail 2A so that the movable body 41 can be mounted to the pair of track rails 2A and 2B. Further, when the release lever 45 is moved in a direction opposite thereto, the moving blocks 3A are separated away from the track rail 2A so that the movable body 41 can be dismounted from the pair of track rails 2A and 2B. This point is the same as in the third embodiment of the mounting and dismounting mechanism illustrated in FIG. 11.

On the other hand, the positioning mechanism configured to fix the movable body to the track rails 2A and 2B is operated by the setting lever 75. By moving the setting lever 75 in the direction indicated by the arrowed line C1 in FIG. 19, the engaging pin 78 moves toward the track rail 2A so that the distal end of the engaging pin 78 is inserted into the fixing hole 26 of the track rail 2A. As a result, the movable body 41 can be fixed to the pair of track rails 2A and 2B. Further, when the setting lever 75 is moved in a direction opposite thereto, the engaging pin 78 is retreated from the fixing hole 26 of the track rail 2A so that the movable body 41 can be freely moved with respect to the pair of track rails 2A and 2B. This point is the same as in the positioning mechanism illustrated in FIG. 14.

As illustrated in FIG. 18, in a state in which the moving blocks 3A are set in the retreated positions and the engaging pin 78 is not inserted into the fixing hole 26 of the track rail 2A, the restricting member 92 fixed to the engaging pin 78 and the groove 93 of the release lever 45 are located in unfit positions. Therefore, even when the setting lever 75 is operated to insert the engaging pin 78 into the fixing hole of the track rail 2A, the restricting member 92 interferes with the release lever 45 so that the setting lever 75 cannot be operated.

On the other hand, when the release lever 45 is operated to set the moving blocks 3A in the mounted positions as illustrated in FIG. 19, the groove 93 of the release lever 45 moves to a position opposed to the restricting member 92 of the engaging pin 78. Therefore, the engaging pin 78 can move toward the track rail 2A. Thus, the engaging pin 78 can be inserted into the fixing hole 26 of the track rail 2A by operating the setting lever 75. Specifically, after the movable body 41 is mounted between the pair of track rails 2A and 2B by operating the release lever 45, the operation of the setting lever 75 is allowed. As a result, the movable body 41 can be fixed to the track rails 2A and 2B.

On the other hand, in a state in which the engaging pin is inserted in the fixing hole 26 of the track rail 2A, the restricting member 92 of the engaging pin 78 is fitted into the groove 93 of the release lever 45. Therefore, unless the engaging pin 78 is withdrawn from the fixing hole 26, the release lever 45 cannot be operated, and hence the setting of the moving blocks 3A is inhibited from being changed from the mounted positions to the retreated positions. Specifically, for the dismounting of the movable body 41 from the pair of track rails 2A and 2B, an operation of withdrawing the engaging pin 78 from the fixing hole 26 of the track rail 2A is first required.

Therefore, even in the fifth embodiment, the order of operation of the mounting and dismounting mechanism and the positioning mechanism for the movable body is restricted, thereby enabling the prevention of the erroneous operation by the operator. In particular, in the fifth embodiment, the restricting member of the engaging pin acts like a latch to firmly restrict the operation of the release lever.

Hence, an error in the order of operation of the release lever and the setting lever can be reliably prevented.

The invention claimed is:

1. A moving unit, comprising:

a first track rail and a second track rail, which are laid on a fixed portion at an interval therebetween, and respectively have guiding surfaces on surfaces opposed to each other;

a first moving block, which is configured to travel on the guiding surface of the first track rail;

a second moving block, which is configured to travel on the guiding surface of the second track rail; and a movable body, which is fixed to both the first moving block and the second moving block, and is configured to be freely movable along the first track rail and the second track rail, the movable body comprising a mounting and dismounting mechanism, which is configured to set the first moving block in a mounted position where the first moving block is held in contact with the first track rail or a retreated position where the first moving block is retreated from the mounted position toward the second track rail, and to retain the first moving block in the mounted position or the retreated position, the mounting and dismounting mechanism being accommodated between the fixed portion and the movable body, wherein the mounting and dismounting mechanism comprises:

a release lever, which is configured to be freely slidable in a direction parallel to the first track rail and the second track rail;

a retaining plate, onto which the first moving block is fixed, the retaining plate being configured to set the first moving block in any one of the mounted position and the retreated position in accordance with an operation of the release lever; and an elastic member, which is configured to urge the first moving block set in the mounted position toward the first track rail.

2. The moving unit according to claim 1, wherein:

the mounting and dismounting mechanism further comprises an auxiliary sliding member, which is configured to move in a moving direction of the retaining plate in accordance with the operation of the release lever; and the elastic member is provided between the first moving block and the auxiliary sliding member.

3. The moving unit according to claim 1, wherein the release lever has any one of end portions, which projects from the movable body when the first moving block is set in the any one of the mounted position and the retreated position.

4. A moving unit, comprising:

a first track rail and a second track rail, which are laid on a fixed portion at an interval therebetween, and respectively have guiding surfaces on surfaces opposed to each other;

a first moving block, which is configured to travel on the guiding surface of the first track rail;

a second moving block, which is configured to travel on the guiding surface of the second track rail; and a movable body, which is fixed to both the first moving block and the second moving block, and is configured to be freely movable along the first track rail and the second track rail, the movable body comprising a mounting and dismounting mechanism, which is configured to set the first moving block in a mounted position where the first moving block is held in contact with the first track rail or a retreated position where the first moving block is retreated from the mounted position toward the second track rail, and to retain the first moving block in the mounted position or the retreated position, the mounting and dismounting mechanism being accommodated between the fixed portion and the movable body, wherein:

any one of the first track rail and the second track rail has a plurality of fixing holes arrayed at a predetermined interval in a longitudinal direction of the any one of the first track rail and the second track rail;

the movable body further comprises a positioning mechanism comprising an engaging pin insertable into and retreatable from an arbitrary one of the plurality of fixing holes;

the positioning mechanism is accommodated together with the mounting and dismounting mechanism between the fixed portion and the movable body; and the engaging pin becomes insertable into the fixing hole after the first moving block is set in the mounted position.

5. The moving unit according to claim 4, wherein movement of the first moving block from the mounted position to the retreated position is inhibited after the engaging pin is inserted into the fixing hole.

* * * * *